2,844,453

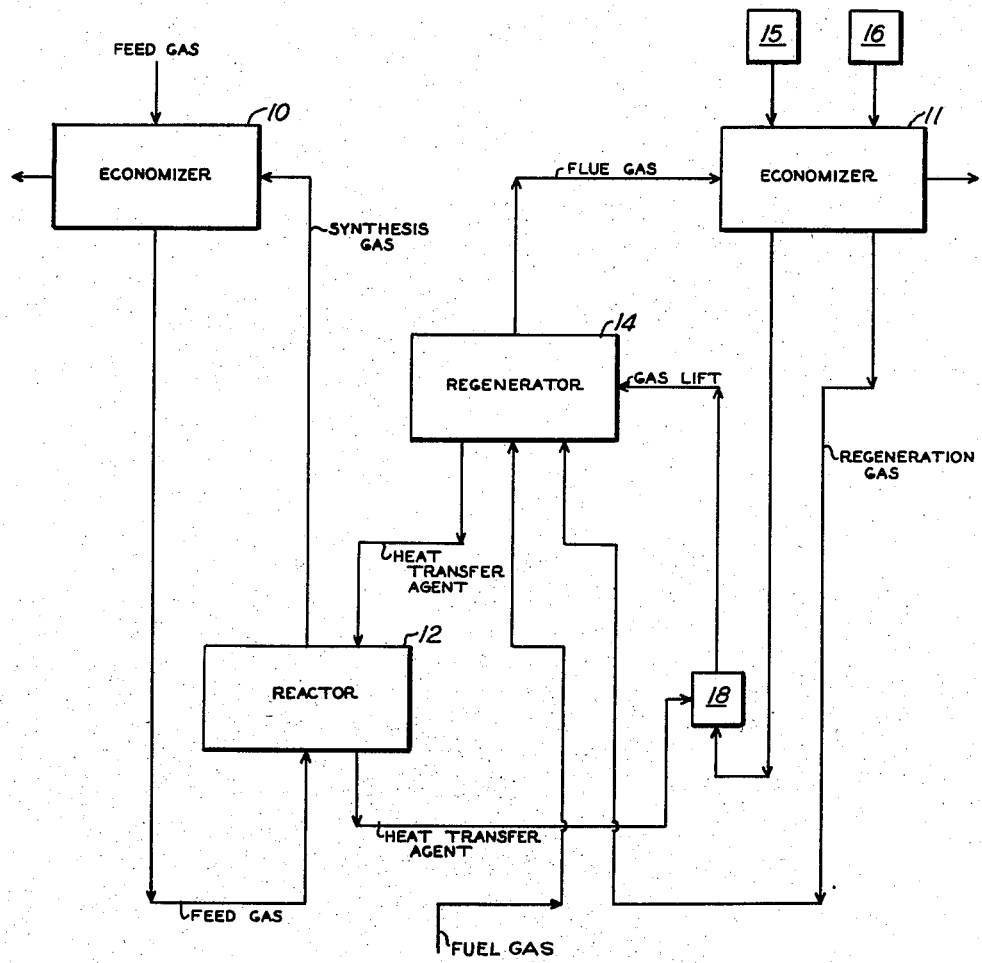

SYNTHESIS GAS MANUFACTURE

Numer Martin Kapp, Swarthmore, and Frederick William Sullivan III, Media, Pa., assignors to Houdry Process Corporation, Wilmington, Del., a corporation of Delaware Application November 6, 1953, Serial No. 390,602

2 Claims. (Cl. 48—196)

The present invention relates to the preparation of gas mixtures, hereinafter called "synthesis gas," which comprise hydrogen and carbon monoxide suitable for use in the preparation of synthesized hydrocarbons. It is more particularly directed to the preparation of synthesis gas from the reaction of normally gaseous hydrocarbons with oxygen and/or carbon dioxide donors carried by a circulating molten heat transfer material.

In co-pending application Serial No. 323,718, filed December 2, 1952, now U. S. Patent 2,754,187, there is described a process for the preparation of synthesis gas by the reaction of normally gaseous hydrocarbons with alkali metal-type carbonates, which carbonates may be molten heat transfer agents, catalysts, oxygen donors and carbon dioxide donors at the same time. The claims of that application are directed to the reaction of the carbonate with the feed gas. The claims of this application are directed to the feature of circulating the molten heat transfer material and the donor material for the purpose of re-heating the heat transfer material and regenerating the donor material. It will be understood that in the process according to this application, the donor material and the molten heat transfer material may be the same substance or they may be separate substances.

The primary object of this invention is reduction of the cost of producing synthesis gas by the elminiation of the necessity for producing relatively high-purity oxygen or relatively high-purity carbon dioxide.

Another object of this invention is the provision of process for continually and efficiently producing synthesis gas from a normally gaseous hydrocarbon and a donor material. Other objects of the invention will be more readily apparent from the accompanying diagrams and the detailed specification.

In general, the objects of the invention are accomplished by circulating a molten heat transfer material and a donor material serially through a reaction chamber and a regeneration chamber. The temperature in the reaction chamber must be in the range of 1400° to 2000° F. and the molten heat transfer material must be one which is liquid within the desired range, preferably within the entire range.

Broadly the donor must be one which is capable of donating pure oxygen or pure carbon dioxide to gaseous hydrocarbons within the specified temperature range. It must also be capable of being rapidly regenerated on contact with an impure source of oxygen or carbon dioxide, as the case may be. Oxygen donors found particularly useful in practicing this invention are stannic oxide, antimony trioxide, and ferric oxide. Carbon dioxide donors found particularly useful in practicing this invention are sodium carbonate, potassium carbonate and barium carbonate.

A list of molten heat transfer agents found suitable for use in this invention is set forth in the following table:

| Heat Transfer Material | Melting Point in Degrees F. | Boiling Point in Degrees F. |
|---|---|---|
| Antimony | 1,160 | 2,630 |
| Bismuth | 520 | 2,650 |
| Lead | 620 | 2,950 |
| Tin | 430 | 4,100 |
| Barium Chloride | 1,760 | 2,840 |
| Calcium Chloride | 1,420 | 3,020 |
| Potassium Chloride | 1,450 | 2,730 |
| Sodium Chloride | 1,470 | 2,740 |
| Copper | 1,980 | 4,170 |

In addition, various mixtures of the above-mentioned metals and compounds or other suitable mixtures, such as eutectic mixtures involving other metals or compounds may be employed.

It will be understood that while the molten heat carrier must always be in a liquid state, the donor can be a liquid or a finely divided solid, suspended or slurried in the carrier. Not only must the heat transfer agent be molten, but it must have sufficient fluidity to permit easy flow. On the other hand, both the donor and the heat transfer agent must be of low enough volatility to avoid substantial evaporation or sublimation losses during operation at temperatures in the range of 1400° to 2000° F. Any catalytic agent which may be employed will usuallly meet requirements similar to those applying to the donor agents.

Regeneration is accomplished by intimately contacting the donor material with a regeneration gas. The gas may be rich in $CO_2$ if a carbonate is used as a donor material or rich in oxygen if a reducible metal oxide is used. Air is the preferred regeneration gas for the reducible metal oxides. Flue gases from the air oxidation of any carbonaceous material or normally gaseous hydrocarbon make a very satisfactory regeneration gas for the carbonate donors. In the preferred method according to this invention, regeneration gas is simply bubbled through the donor-carrying molten heat transfer agent.

The reactions of this invention vary, depending on what type of donor is used. Where a reducible metal oxide is used as an oxygen donor, the chemical reactions may be:

(1) Reaction chamber—

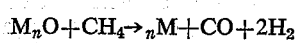
$$M_nO + CH_4 \rightarrow {}_nM + CO + 2H_2$$

(2) Regeneration chamber—

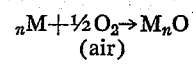
$$_nM + \tfrac{1}{2}O_2 \rightarrow M_nO$$
(air)

Where M is the metal of any reducible metal oxide, n is the subscript value obtained by dividing the valence of oxygen by the valence of M and the methane may be substituted in whole or in part by any other normally gaseous hydrocarbons.

Where the donor is a carbonate, the chemical reactions may be:

(1) Reaction chamber—

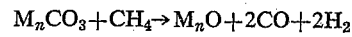
$$M_nCO_3 + CH_4 \rightarrow M_nO + 2CO + 2H_2$$

(2) Regeneration chamber—

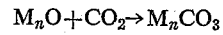
$$M_nO + CO_2 \rightarrow M_nCO_3$$

Where M represents an alkali metal or an alkaline earth metal, n is the subscript value obtained by dividing the valence of oxygen by the valence of M, and the methane may be substituted in whole or in part by other normally gaseous hydrocarbons.

In addition to the type of operation set forth immediately above, it is possible to vary the hydrogen and carbon monoxide ratios by introducing to the reactor controlled amounts of steam. For example, a reaction of the following nature results in a different hydrogen to carbon monoxide ratio than the reaction set forth above.

$$Na_2CO_3 + 2CH_4 + H_2O \rightarrow Na_2O + 3CO + 5H_2$$

By changing the steam-hydrocarbon ratio of the charge gas, the hydrogen to carbon monoxide ratios in the product can be regulated to an appreciable extent. This is of definite advantage in synthesis operations wherein the requirements of the charge stock include specific hydrogen to carbon monoxide ratios which can be met as described above.

The diagrammatic sketch in Figure 1 illustrates a typical system found useful in practicing this invention. The system includes a reactor 12 and a regenerator 14 having a heat transfer agent circulation system as lettered on the drawing. Heat economizers 10 and 11 preheat the feed gas and the regeneration gas by cooling the synthesis gas from the reactor and flue gas from the regenerator respectively. Feed gas is urged through the economizer 10 and the reactor under pressure. Regeneration gas is forced through economizer 11 by pumps 15 and 16, the gas from the former serving as the motivating force of a gas lift and the latter serving as the primary source of regeneration gas.

Typical examples of the process of this invention are as follows:

Example I

Methane is preheated to about 1000° F. in economizer 10 from which it is fed to reactor 12, about 18 feet in diameter, which contains molten tin and stannic oxide at a temperature of about 1700° F. The methane reacts with the stannic oxide to form synthesis gas. The high temperature of the synthesis gas is utilized in economizer 10 to preheat incoming methane.

The regenerator 14 is about 24 feet in diameter and is heated to about 1800° F. Air fed through economizer 11 is preheated to about 1000° F. The air from pump 16 is bubbled upwardly through the molten tin from the bottom of the regenerator to form stannic oxide. The air from pump 15 is passed through an eductor 18 for gas lifting molten tin from a level below the reactor to the upper part of the regenerator. This air also helps oxidize the tin. Flue gas, taken off from the regenerator at about 1800° F. is flowed through economizer 11 for pre-heating air.

In this example, for each cubic foot of methane fed, 3 cubic feet of synthesis gas are produced, and for each 3 cubic feet of synthesis gas produced, 2.88 cubic feet of air are required for regenerating the stannic oxide.

Example II

Molten barium chloride is used as a heat transfer medium in place of the molten tin of Example I; barium carbonate, a carbon dioxide donor, replaces the stannic oxide of Example I; and flue gas from burning methane is used as a regenerating gas in place of the air of Example I.

Obviously, many modifications and variations of the invention as hereinbefore set forth may be made without departing from the spirit and scope thereof, and therefore only such limitations should be imposed as are indicated in the appended claims.

We claim:
1. In the method of continuously producing synthesis gas by the reaction of a normally gaseous hydrocarbon with a reducible metal oxide donor material to form as gaseous products CO and $H_2$, the improvement which comprises circulating said metal oxide donor material in admixture with an insert inorganic molten heat transfer agent through a reaction zone while at a temperature in the range of 1400–2000° F., passing such normally gaseous hydrocarbon at a temperature below that of said molten agent into said admixture in said reaction zone to effect reaction between said donor material and said hydrocarbon with reduction of said donor material to lower valence state, withdrawing from said reaction zone molten heat transfer agent containing said donor material in lower valence state and passing the withdrawn admixture to a reheating and regenerating zone, contacting said last-mentioned admixture in said last-mentioned zone with heated oxygen-containing gas to restore said donor material to its original metal oxide form while simultaneously effecting reheating of the heat transfer agent, returning said restored donor material and said reheated transfer agent to said reaction zone, and continuously withdrawing gaseous products from said reaction zone.

2. The method in accordance with claim 1 wherein said oxygen-containing gas is air, said molten heat transfer agent is tin and said donor material is stannic oxide.

References Cited in the file of this patent

UNITED STATES PATENTS

| | | |
|---|---|---|
| 1,943,821 | Hanks et al. | Jan. 16, 1934 |
| 2,449,359 | Abrams et al. | Sept. 14, 1948 |
| 2,513,994 | Davidson | July 4, 1950 |
| 2,602,809 | Dickinson | July 8, 1952 |
| 2,671,719 | Lewis | Mar. 9, 1954 |
| 2,671,720 | Lewis et al. | Mar. 9, 1954 |

FOREIGN PATENTS

| | | |
|---|---|---|
| 597,221 | Great Britain | Jan. 21, 1948 |

UNITED STATES PATENT OFFICE

CERTIFICATE OF CORRECTION

Patent No. 2,844,453                          July 22, 1958

Numer Martin Kapp et al.

It is hereby certified that error appears in the printed specification of the above numbered patent requiring correction and that the said Letters Patent should read as corrected below.

Column 4, line 19, for "insert" read -- inert --.

Signed and sealed this 21st day of October 1958.

(SEAL)
Attest:

KARL H. AXLINE                                  ROBERT C. WATSON
Attesting Officer                               Commissioner of Patents